US012717613B2

(12) United States Patent
Wang et al.

(10) Patent No.: US 12,717,613 B2
(45) Date of Patent: Aug. 25, 2026

(54) SYSTEM FRAMEWORK FOR SELECTING COMPUTING DEVICE TO PERFORM VEHICLE APPLICATIONS WITH CLOUD AND EDGE COMPUTING

(71) Applicant: Toyota Motor Engineering & Manufacturing North America, Inc., Plano, TX (US)

(72) Inventors: Haoxin Wang, Mountain View, CA (US); Dawei Chen, Mountain View, CA (US); Rohit Gupta, Mountain View, CA (US); Kyungtae Han, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 639 days.

(21) Appl. No.: 18/173,867

(22) Filed: Feb. 24, 2023

(65) Prior Publication Data

US 2024/0289165 A1 Aug. 29, 2024

(51) Int. Cl.

| | |
|---|---|
| ***G06F 9/46*** | (2006.01) |
| ***G06F 9/48*** | (2006.01) |
| ***G07C 5/00*** | (2006.01) |

(52) U.S. Cl.
CPC ........... *G06F 9/4875* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 10,924,337 B2 | 2/2021 | Higuchi et al. | |
| 2017/0017776 A1 | 1/2017 | Soulos et al. | |
| 2021/0181739 A1* | 6/2021 | Chen .................. | B60W 40/105 |

FOREIGN PATENT DOCUMENTS

| | | |
|---|---|---|
| CN | 107959708 B | 10/2020 |
| CN | 112749855 A | 5/2021 |

OTHER PUBLICATIONS

Habiba et al; A Reverse Auction Model for Efficient Resource Allocation in Mobile Edge Computation Offloading; IEEE, 2019 (Year: 2019).*

* cited by examiner

*Primary Examiner* — Bing Zhao
(74) *Attorney, Agent, or Firm* — DINSMORE & SHOHL LLP

(57) ABSTRACT

A cloud server may estimate an amount of computing resources needed to perform a computing task, generate a first proposal indicating first parameters for the server to perform the task based on the estimate, obtain, from one or more edge servers, second proposals indicating second parameters for the edge servers to perform the task, transmit the first proposal and the second proposals to a vehicle, upon receiving acceptance of the first proposal, perform the task based on the first parameters, and transmit data associated with performance of the task to the vehicle, and upon receiving acceptance of one of the second proposals, transmit the acceptance to the edge server associated with the accepted proposal.

15 Claims, 8 Drawing Sheets

SYSTEM FRAMEWORK FOR SELECTING COMPUTING DEVICE TO PERFORM VEHICLE APPLICATIONS WITH CLOUD AND EDGE COMPUTING

TECHNICAL FIELD

The present disclosure relates to vehicle systems, and more particularly, to a system framework for software and hardware configuration determination for vehicle applications with cloud and edge computing.

BACKGROUND

As vehicles become more advanced, vehicle systems may run a variety of vehicle applications. These applications may be run directly by a vehicle system, or by an edge server or cloud server. Although these different options provide similar functions, they may have significant differences in terms of performance, service requirements, and other benefits and drawbacks. For example, a vehicle system, an edge server, and a cloud server may all have different hardware and computing capabilities. In addition, different applications may require different amounts of data transmission between a vehicle system, an edge server, and a cloud server. As such, there is a need for improved systems and methods to determine hardware and software configurations for executing vehicle applications among vehicle systems, edge servers, and cloud computing devices.

SUMMARY

In one embodiment, a computing device may comprise a processor configured to determine an estimated amount of computing resources needed for the computing device to perform a computing task. The computing device may generate a first proposal indicating first parameters for the computing device to perform the computing task based on the estimated amount. The computing device may obtain, from one or more second computing devices, one or more second proposals indicating second parameters for one or more of the second computing devices to perform the computing task. The computing device may transmit the first proposal and the one or more second proposals to a vehicle. Upon receiving an acceptance of the first proposal, the computing device may perform the computing task based on the first parameters, and transmit data associated with performance of the computing task to the vehicle. Upon receiving an acceptance of one of the second proposals from the vehicle, the computing device may transmit the acceptance to a second computing device among the one or more second computing devices associated with a second proposal among the one or more second proposals that was accepted.

In another embodiment, a method may include determining an estimated amount of computing resources needed for a computing device to perform a computing task. The method may include generating a first proposal indicating first parameters for the computing device to perform the computing task based on the estimated amount. The method may include obtaining, from one or more second computing devices, one or more second proposals indicating second parameters for one or more of the second computing devices to perform the computing task. The method may include transmitting the first proposal and the one or more second proposals to a vehicle. Upon receiving an acceptance of the first proposal, the method may include performing the computing task based on the first parameters, and transmitting data associated with performance of the computing task to the vehicle. Upon receiving an acceptance of one of the second proposals, the method may include transmitting the acceptance to a second computing device among the one or more second computing devices associated with a second proposal among the one or more second proposals that was accepted.

In another embodiment, a system may include a cloud server and one or more edge servers. The cloud server may determine an estimated amount of computing resources needed for the cloud server to perform a computing task. The cloud server may generate a first proposal indicating first parameters for the cloud server to perform the computing task based on the estimated amount. The cloud server may transmit the first proposal to a vehicle. Upon receiving an acceptance of the first proposal from the vehicle, the cloud server may perform the computing task based on the first parameters, and transmit data associated with performance of the computing task to the vehicle. The one or more edge servers may transmit, to the vehicle, one or more second proposals indicating second parameters for one or more of the edge servers to perform the computing task. Upon receiving an acceptance of one of the second proposals from the vehicle, one or more edge servers may perform the computing task based on the second parameters, and transmit second data associated with performance of the computing task by the one of the one or more edge servers to the vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a system framework for software and hardware configuration determination for vehicle applications with cloud and edge computing. When a vehicle system desires to perform a computing task (e.g., executing a vehicle application such as object detection or navigation), the vehicle system may transmit a service request to a cloud server. The service request may specify one or more requirements associated with the computing task to be performed (e.g., a service duration, a required latency, a budget, and the like). Upon receiving the service request, the cloud computing server may estimate the amount of computing resources needed for performing the computing task. The cloud server may also transmit the service request to one or more edge servers, which may each estimate the amount of computing resources needed for performing the task.

After the cloud server and the edge servers determine the amount of computing resources needed for performing the task, the vehicle system, the cloud server, and the edge servers may negotiate an optimal hardware and/or software configuration for performing the computing task, as disclosed herein. In particular, the vehicle system, the cloud server, and the edge servers may determine which entity or entities among them is to perform the task with what hardware and/or software configurations. As such, the embodiments disclosed herein may intelligently allocate the execution of vehicle applications between a vehicle system, a cloud server, and one or more edge servers, and select the most appropriate option under different circumstances to optimize service performance.

Figure 1:
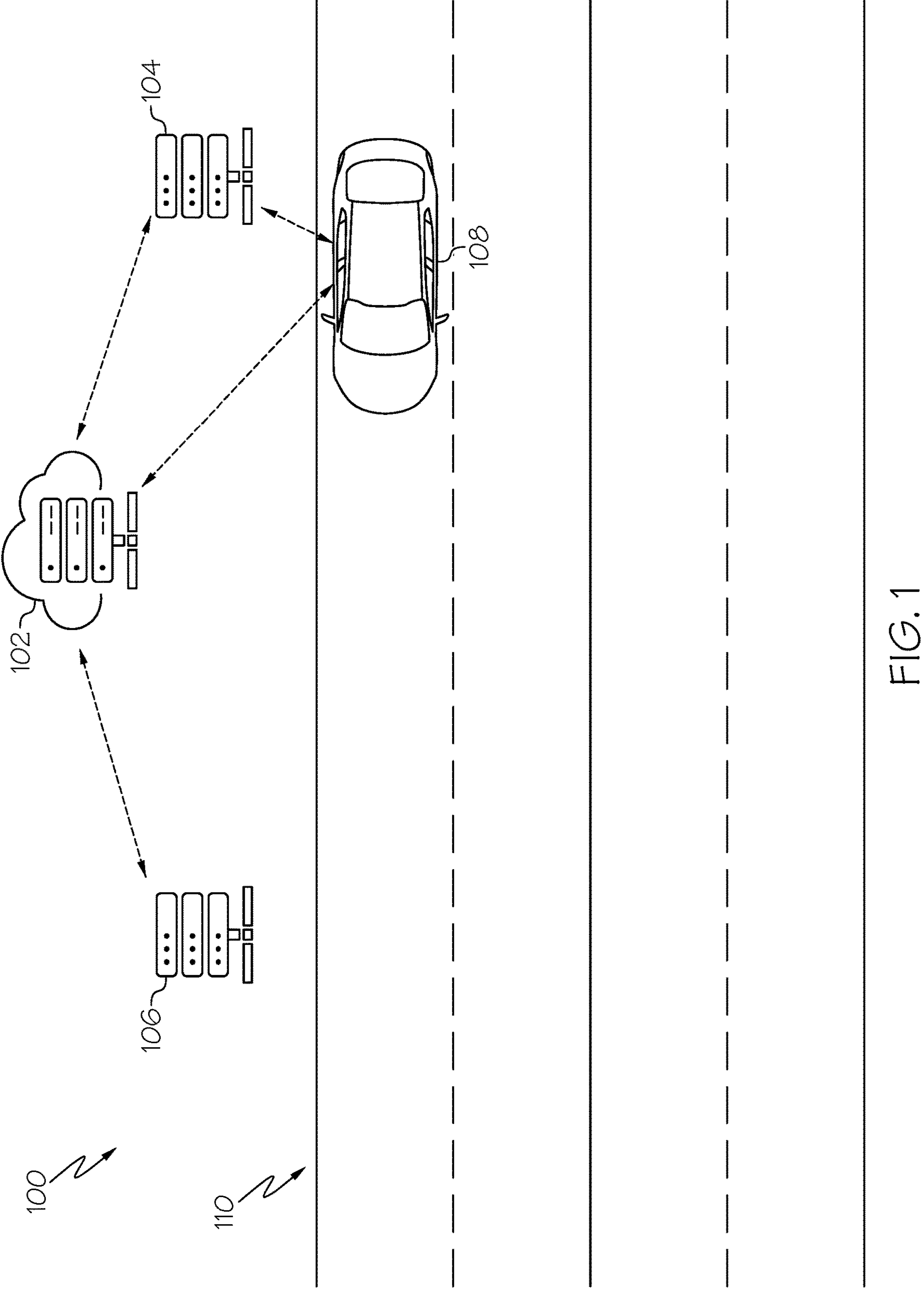
FIG. 1 depicts example system framework for software and hardware configuration determination for vehicle applications with cloud and edge computing, according to one or more embodiments shown and described herein.

Turning now to the figures, FIG. 1 schematically depicts a system 100 for executing vehicle applications, as disclosed herein. In the example of FIG. 1, the system 100 includes a cloud server 102, edge servers 104 and 106, and a vehicle 108 driving along a road 110.

In the example of FIG. 1, the vehicle 108 is a connected vehicle. A connected vehicle is able to communicate remotely with systems outside of the vehicle (e.g., the cloud server 102 and/or the edge servers 104, 106). In the example of FIG. 1, the cloud server 102 may be communicatively coupled to the edge server 104, 106. Also in the example of FIG. 1, the vehicle 108 may be communicatively coupled to the cloud server 102 and the edge servers 104 and/or 106. In the example of FIG. 1, the vehicle 108 is within range of and communicatively coupled to the edge server 104. However, in the example of FIG. 1, the vehicle 108 is not within range of, and therefore not communicatively coupled to, the edge server 106.

In the illustrated example, the cloud server 102 comprises a cloud computing device. However, in other examples, the cloud server 102 may be any other type of remote computing device communicatively coupled to the edge servers 104, 106 and the vehicle 108.

In some examples, the edge servers 104, 106 may comprise road-side units (RSUs) positioned near the road 110. While the example of FIG. 1 illustrates two edge servers 104, 106, it should be understood that in other examples, the system 100 may comprise any number of edge servers. The edge servers of the system 100 may be spaced along the road 110 such that each edge server covers a different service area. That is, as the vehicle 108 drives along the road 110, the vehicle 108 may be within range of one or more edge servers at any given time. Thus, as the vehicle 108 drives along the road 110, the vehicle 108 may move between coverage areas of different edge servers. At some locations along the road 110, the vehicle 108 may be in range of a single edge server. At other locations along the road 110, the vehicle 108 may be in range of multiple edge servers. At still other locations along the road 110, the vehicle 108 may not be in range of any edge servers.

In embodiments, a vehicle system of the vehicle 108 may transmit a service request to the cloud server 102 comprising a request for the performance of a computing task. The computing task may be a task to assist in operation of the vehicle 108. In particular, the vehicle 108 may be a fully or partially autonomous vehicle, which may continually perform a variety of computations to autonomously operate the vehicle. However, the on-board computing resources of the vehicle 108 are limited. As such, the vehicle system of the vehicle 108 may be able to operate more efficiently by having an external device (e.g., the cloud server 102 or the edge servers 104, 106) execute one or more computing tasks. This may reduce the computational load on the vehicle 108 and allow certain computing tasks to be performed more quickly or efficiently. In some embodiments, the vehicle system of the vehicle 108 may transmit the route information of the vehicle to the cloud server 102. The cloud server 102 may select one or more edge servers among multiple edge server candidates based on the route information and other information such as technical details about the computing task to be performed (e.g., what operations are to be performed, how much and what type of data is involved, what type of computing models are to be used, and the like) and certain requirements associated with the task such as latency (e.g., a maximum time period for completing the task), and budget (e.g., a maximum cost for completing the task). Operation of the vehicle system of the vehicle 108, the cloud server 102, and the edge servers 104, 106 are described in further detail below.

Figure 2:
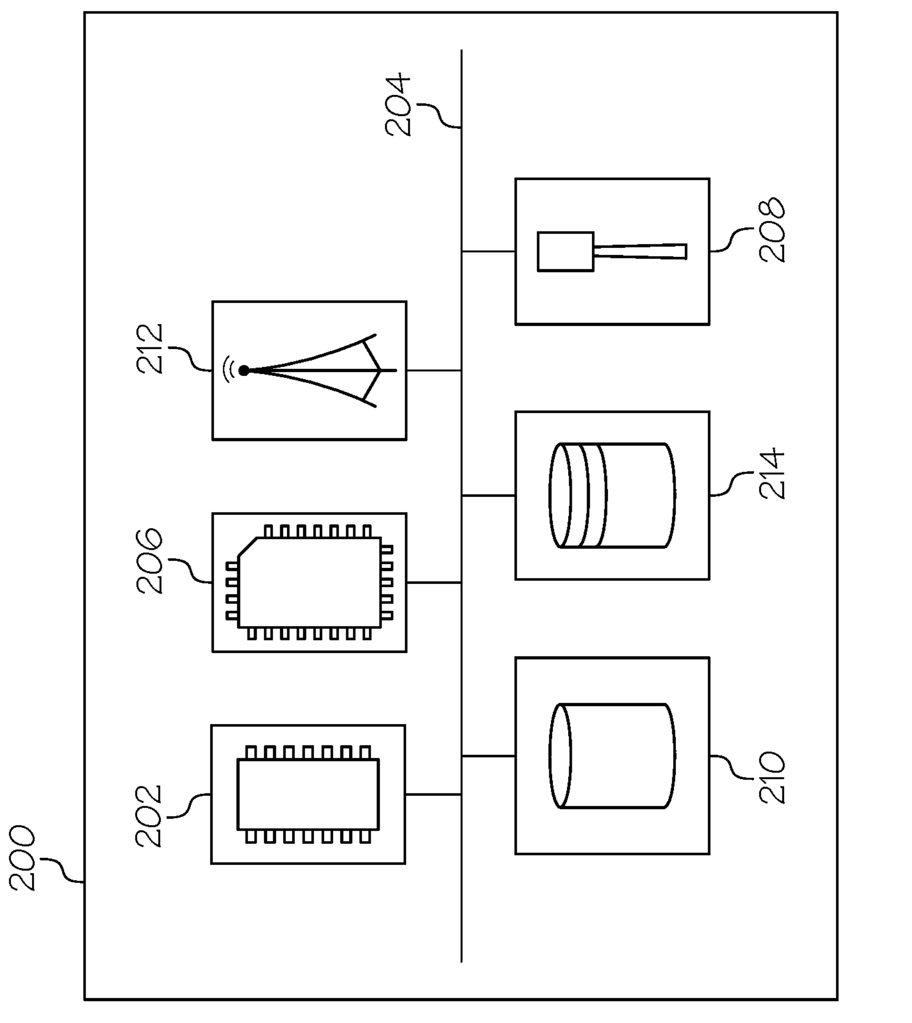
FIG. 2 schematically depicts an example vehicle system, according to one or more embodiments shown and described herein.

FIG. 2 depicts an example vehicle system 200 that may be included in the vehicle 108 of FIG. 1. In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. For an autonomous vehicle, the vehicle sensors 210 may be used to autonomously drive the vehicle.

Still referring to FIG. 2, the vehicle system 200 comprises network interface hardware 212 for communicatively coupling the vehicle system 200 to the cloud server 102 and the edge servers 104, 106. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit a request for media content to the cloud server 102 and may download media content from the edge servers 104, 106, as disclosed herein.

Still referring to FIG. 2, the vehicle system 200 comprises a data storage component 214. The data storage component 214 may store data used by various components of the vehicle system 200. In addition, the data storage component 214 may store data received from the cloud server 102 and/or the edge servers 104, 106.

In some embodiments, the vehicle system 200 may be communicatively coupled to the cloud server 102 and/or the edge servers 104, 106 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
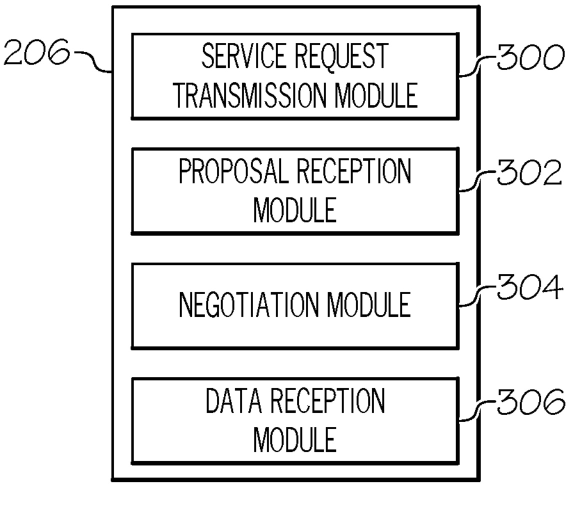
FIG. 3 schematically depicts example memory modules of the vehicle system of FIG. 2, according to one or more embodiments shown and described herein.

Turning now to FIG. 3, the one or more memory modules 206 are schematically depicted. The one or more memory modules 206 include a service request transmission module 300, a proposal reception module 302, a negotiation module 304, and a data reception module 306. Each of the service request transmission module 300, the proposal reception module 302, the negotiation module 304, and the data reception module 306 may be a program module in the form of operating systems, application program modules, and other program modules stored in the one or more memory modules 206. Such a program module may include, but is not limited to, routines, subroutines, programs, objects, components, data structures and the like for performing specific tasks or executing specific data types as will be described below.

The service request transmission module 300 may transmit a service request to the cloud server 102. In particular, the service request transmission module 300 may transmit a service request indicating a request for a computing task to be performed. As discussed above, the vehicle system 200 may desire to execute a variety of applications that may be more efficiently executed by an external device (e.g., the cloud server 102 or the edge servers 104, 106). As such, the service request may indicate a computing task that the vehicle system 200 requests to be performed by another entity. Such a computing task may comprise object detection, object tracking, object motion prediction, navigation functions, adaptive cruise control, adaptive driver assistance systems, and the like.

The service request transmitted by the service request transmission module 300 may indicate a variety of information about the computing task to be performed. For example, the service request may indicate technical details about the computing task to be performed (e.g., what operations are to be performed, how much and what type of data is involved, what type of computing models are to be used, and the like). The service request may also indicate certain requirements associated with the task such as latency (e.g., a maximum time period for completing the task), and budget (e.g., a maximum cost for completing the task).

The proposal reception module 302 may receive a proposal for performing the computing task specified by the service request transmission module 300. In particular, the proposal reception module 302 may receive one or more proposals from the cloud server 102 and/or the edge servers 104, 106 for performing the computing task. Each of the one or more proposals received by the proposal reception module 302 may indicate which entity is to perform the computing task (e.g., the cloud server 102, the edge server 104, or the edge server 106), or one or more sub-tasks thereof, as well as parameters or other information about the performance of the computing task. In particular, a proposal received by the proposal reception module 302 may indicate a latency associated with performance of the computing task and a cost of performing the computing task. In some examples, a proposal received by the proposal reception module 302 may indicate other information about performance of the computing task under the proposal, such as the type of a computing model to be used to perform the computing task, or specific hardware and software configurations to be used.

After the proposal reception module 302 receives one or more proposals, the negotiation module 304 may select one of the proposals for performance of the computing task. As discussed above, each proposal received by the proposal reception module 302 may indicate various information about the performance of the computing task. As such, the negotiation module 304 may select a particular proposal based on this information. For example, one proposal may involve the cloud server 102 performing the computing task with a certain latency at a certain cost. Another proposal may involve the edge server 104 performing the computing task with a different latency and cost. Another proposal may involve the computing task being performed by the cloud server 102, the edge server 104, and the edge server 106 (e.g., each entity performing different portions of the task) with a particular latency and cost.

In embodiments, the negotiation module 304 may select a proposal received by the proposal reception module 302 based on the information associated with the received proposals. In embodiments, the vehicle system 200 may have certain requirements for performance of the computing task. For example, the vehicle system 200 may require that the computing task be performed with a maximum latency and/or cost. In other examples, the vehicle system 200 may require that the computing task be performed using a particular computing model. In embodiments, the negotiation module 304 may determine which of the proposals received by the proposal reception module 302 satisfy the requirements.

If only one received proposal satisfies the requirements of the vehicle system 200, the negotiation module 304 may select the proposal that satisfies the requirements. If multiple proposals satisfy the requirements of the vehicle system 200, the negotiation module 304 may select from among the plurality of proposals that satisfy the requirements based on a variety of factors. In one example, the negotiation module 304 may select the proposal with the lowest latency. In another example, the negotiation module 304 may select the proposal having the lowest cost. In still another example, the negotiation module 304 may weigh the latency and cost by predetermined weighting factors, and select the proposal with the optimal combined latency and cost based on the weighting factors. In embodiments, the weighting factors may indicate how much latency should be considered compared with how much cost should be considered and may be specified by a user. In other examples, the negotiation module 304 may consider factors other than latency and cost.

If the proposal reception module 302 does not receive any proposals that satisfy the requirements of the vehicle system 200, the negotiation module 304 may perform a variety of actions depending on user specified parameters. In one example, the negotiation module 304 may select an optimal proposal based on the factors discussed above even though the proposal does not meet the specified requirements. In another example, if the proposal reception module 302 does not receive any proposals that meet the specified requirements, the negotiation module 304 may reject all received proposals and the vehicle system 200 may perform the computing task locally.

After the negotiation module 304 selects a proposal for the performance of the specified computing task the negotiation module 304 may transmit a signal to the entity or entities to perform the computing task (e.g., the cloud server 102 or the edge servers 104, 106) indicating an acceptance of the selected proposal. The specified entity or entities may then perform the computing task under the specified conditions, as described in further detail below.

After the specified entity or entities perform the computing task, the data generated by the performance of the computing task may be transmitted to the vehicle system 200, and may be received by the data reception module 306. The vehicle system 200 may then utilize the data received by the data reception module 306 for the continued operation of the vehicle 108. In particular, the vehicle system 200 may perform one or more autonomous driving operations based on the received data.

Figure 4:
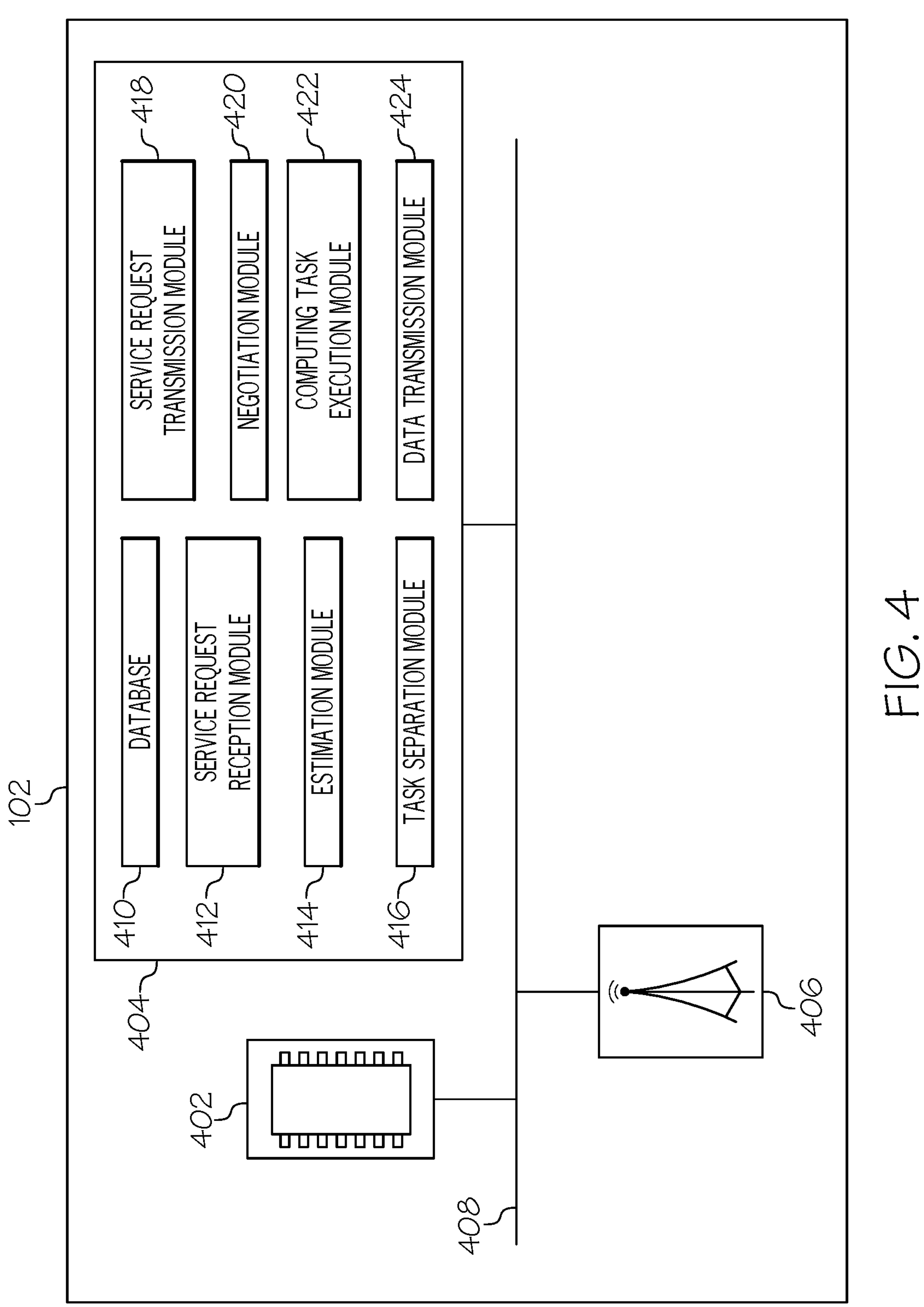
FIG. 4 schematically depicts an example cloud server, according to one or more embodiments shown and described herein.

Now referring to FIG. 4, the cloud server 102 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. The network interface hardware 406 of the cloud server 102 may transmit data to and receive data from vehicles (e.g., the vehicle 108 of FIG. 1) and one or more edge servers (e.g., the edge servers 104, 106 of FIG. 1).

The one or more memory modules 404 include a database 410, a service request reception module 412, an estimation module 414, a task separation module 416, a service request transmission module 418, a negotiation module 420, a computing task execution module 422, and a data transmission module 424. Each of the database 410, the service request reception module 412, the estimation module 414, the task separation module 416, the service request transmission module 418, the negotiation module 420, the computing task execution module 422, and the data transmission module 424 may be a program module in the form of operating systems, application program modules, and other program modules stored in the one or more memory modules 404. In some embodiments, the program module may be stored in a remote storage device that may communicate with the cloud server 102. Such a program module may include, but is not limited to, routines, subroutines, programs, objects, components, data structures and the like for performing specific tasks or executing specific data types as will be described below.

The database 410 may temporarily store data received from one or more vehicles (e.g., the vehicle 108 of FIG. 1) and/or edge servers (e.g., the edge servers 104, 106 of FIG. 1). As described above, the cloud server 102 may receive service requests from the vehicle 108. As such, the cloud server 102 may store the service request and any associated data needed to perform computing tasks to fulfill service requests in the database 410. The database 410 may also store data generated by the cloud server 102 after performing computing tasks, as disclosed herein.

The service request reception module 412 may receive service requests from vehicles (e.g., the vehicle 108 of FIG. 1). A service request may indicate a computing task to be performed, as well as service requirements, other information associated with the computing task to be performed, and route information about the vehicles, as discussed above.

The estimation module 414 may estimate the amount of computing resources needed to perform a computing task specified in a service request received by the service request reception module 412. As discussed above, a service request may indicate the operations to be performed to execute the specified computing task as well as any latency, budget, or other requirements associated with the computing task. As such, the estimation module 414 may estimate the amount of computing resources needed to perform the computing task based on the operations to be performed, the service requirements, and the hardware and software capabilities of the cloud server 102.

The task separation module 416 may separate the computing task specified by a service request into a plurality of sub-tasks that may be completed by different entities. For example, certain sub-tasks may be performed by the cloud server 102, certain sub-tasks may be performed by the edge servers 104 and/or 106, and certain sub-tasks may be performed by the vehicle 108. By separating a computing task into a plurality of sub-tasks, multiple entities may complete the computing task more efficiently than if the entire computing task were performed by a single entity. As such, the task separation module 416 may determine a plurality of sub-tasks that can be performed separately, and the results combined to collectively perform the computing task in its entirety. In examples where the task separation module 416 is able to separate a computing task into a plurality of sub-tasks, the estimation module 414 may determine an amount of computing resources needed to complete each sub-task.

The service request transmission module 418 may transmit the service request received by the service request reception module 412 to one or more edge servers (e.g., the edge servers 104, 106 of FIG. 1). This may allow the system 100 to determine whether the computing task included in the service request should be performed by the cloud server 102, the edge servers 104, 106, or some combination thereof, as disclosed herein. In examples where the task separation module 416 is able to separate a computing task into a plurality of sub-tasks, the service request transmission module 418 may transmit data indicating the determined sub-tasks associated with the service request being transmitted to one or more edge servers.

The negotiation module 420 may negotiate with the vehicle 108 and/or the edge servers 104, 106 to determine which entity or entities should perform the computing task, as disclosed herein. In particular, the negotiation module 420 may generate a proposal indicating details about how the cloud server 102 may perform the requested computing task. The details of the proposal may be determined based on determinations made by the estimation module 414 with respect to the computing resources needed to perform the requested computing task. In embodiments, the negotiation module 420 may generate a proposal indicating a latency and a cost associated with the performance of the computing task. In other examples, the proposal may indicate other information about the performance of the computing task, such as a computing module to be used, an allocated bandwidth, and the like. In one example, a proposal may indicate an allocated bandwidth of 8 MHZ, a guaranteed latency of less than 200 ms, an estimated cost of $1.20 per hour, and the use of a model for San Francisco. In another example, a proposal may indicate no allocated bandwidth, a guaranteed latency of less than 600 ms, an estimated cost of $0.80 per hour, and the use of a model for the mainland United States. After the negotiation module 420 generates a proposal, the proposal may be transmitted to the vehicle 108.

In some examples, the negotiation module 420 may communicate with one or more edge servers (e.g., the edge servers 104, 106 of FIG. 1) to determine information associated with the performance of the computing task. As discussed above, the task separation module 416 may divide the computing task into a plurality of sub-tasks, and the service request transmission module 418 may transmit information about the sub-tasks to the edge servers 104, 106. When the edge servers 104, 106 receive information about the sub-tasks, they may determine information (e.g., latency and cost) associated with the performance of each of the sub-tasks, and transmit this information back to the cloud server 102, as discussed in further detail below. The negotiation module 420 may receive this information and may determine an optimal configuration for performing each of the sub-tasks among the cloud server, the edge server 104, and the edge server 106.

The optimal configuration may be based on lowest latency, lowest cost, or a combination thereof. For example, the task separation module 416 may divide the requested computing task into three sub-tasks, and the negotiation module 420 may determine that the optimal configuration is for the cloud server 102, the edge server 104, and the edge server 106 to each perform one of the sub-tasks. After the negotiation module 420 determines an optimal configuration for the performance of the various sub-tasks, the negotiation module 420 may generate a proposal based on this information and transmit the proposal to the vehicle 108. In some examples, the negotiation module 420 may determine multiple proposals with different hardware and/or software configurations for performing the task (e.g., different entities or combinations of entities may perform the tasks or different sub-tasks for different proposals).

After the negotiation module 420 transmits a proposal to the vehicle 108, the vehicle 108 may transmit an acceptance or a denial of the proposal to the cloud server 102. If the vehicle 108 does not accept the proposal, then the cloud server 102 does not execute the computing task. If the vehicle 108 accepts the proposal, the computing task execution module 422 may execute the computing task in accordance with the proposal. In particular, the computing task execution module 422 may receive any data from the vehicle 108 needed to perform the computing task (e.g., sensor data collected by the vehicle 108), and may execute the computing task or sub-tasks, as specified by the accepted proposal, using the computing model specified by the accepted proposal. After the computing task execution module 422 completes the performance of the computing task, the data transmission module 424 may transmit any data generated to the vehicle 108 (e.g., results generated by the performance of the computing task).

Figure 5:
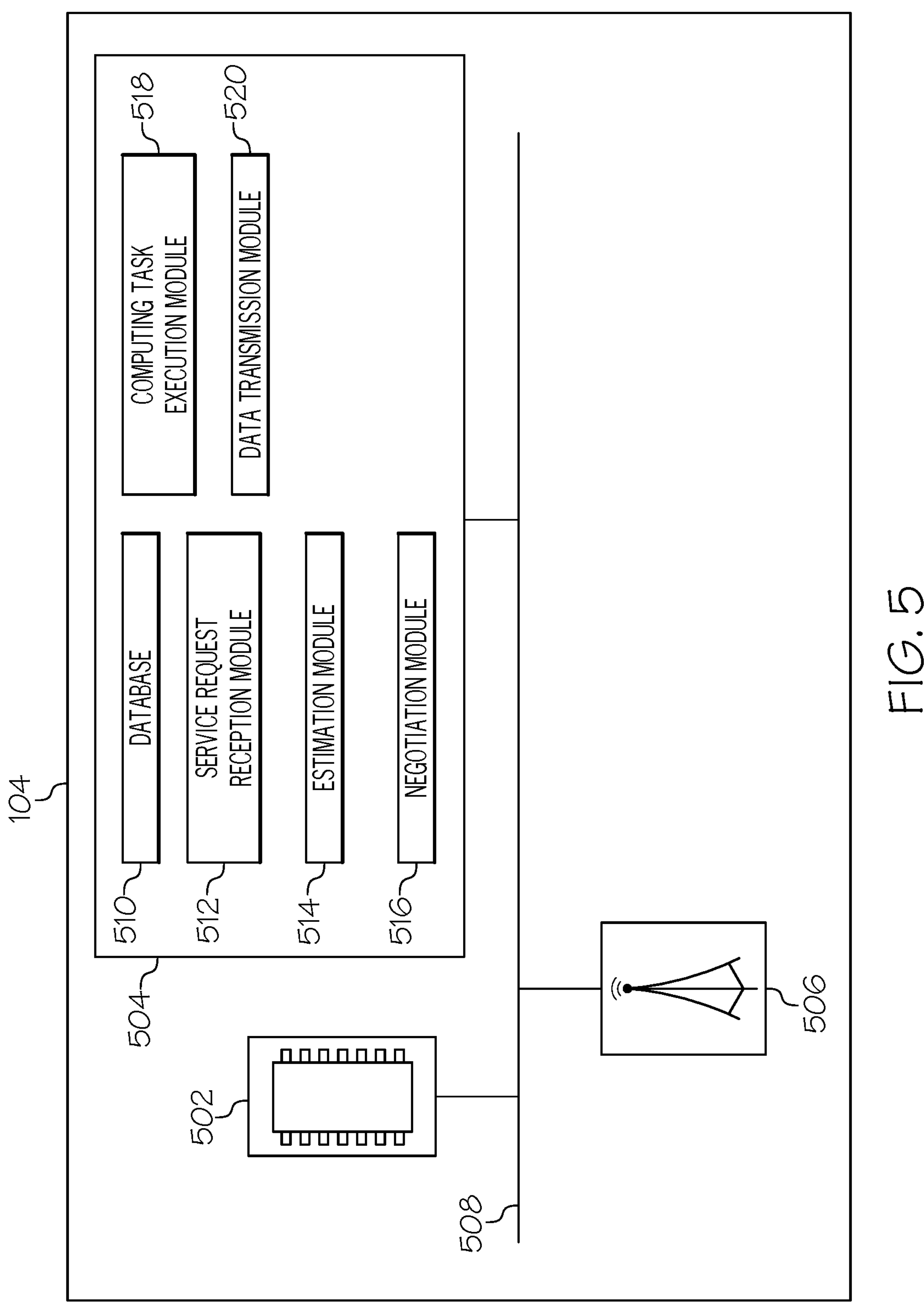
FIG. 5 schematically depicts an example edge server, according to one or more embodiments shown and described herein.

Now referring to FIG. 5, the edge server 104 is schematically depicted. However, it should be understood that the edge server 106 may be constructed in a similar manner. In the example of FIG. 5, the edge server 104 comprises one or more processors 502, one or more memory modules 504, network interface hardware 506, and a communication path 508. The one or more processors 502 may be a controller, an integrated circuit, a microchip, a computer, or any other computing device. The one or more memory modules 504 may comprise RAM, ROM, flash memories, hard drives, or any device capable of storing machine readable and executable instructions such that the machine readable and executable instructions can be accessed by the one or more processors 502.

The network interface hardware 506 can be communicatively coupled to the communication path 508 and can be any device capable of transmitting and/or receiving data via a network. Accordingly, the network interface hardware 506 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. The network interface hardware 506 of the edge server 104 may transmit data to and receive data from the cloud server 102 and vehicles (e.g., the vehicle 108 of FIG. 1).

The one or more memory modules 504 include a database 510, a service request reception module 512, an estimation module 514, a negotiation module 516, a computing task execution module 518, and a data transmission module 520. Each of the database 510, the service request reception module 512, the estimation module 514, the negotiation module 516, the computing task execution module 518, and the data transmission module 520 may be a program module in the form of operating systems, application program modules, and other program modules stored in the one or more memory modules 504. In some embodiments, the program module may be stored in a remote storage device that may communicate with the edge server 104. Such a program module may include, but is not limited to, routines, subroutines, programs, objects, components, data structures and the like for performing specific tasks or executing specific data types as will be described below.

The database 510 may temporarily store data received from one or more vehicles (e.g., the vehicle 108 of FIG. 1) and/or the cloud server 102. As described above, the vehicle 108 may transmit service requests to the cloud server 102, and the cloud server 102 may transmit service requests to the edge server 104. As such, the edge server 104 may store service request information and any associated data needed to perform computing tasks in the database 510. The database 510 may also store data generated by the edge server 104 after performing computing tasks, as disclosed herein.

The service request reception module 512 may receive service requests from the cloud server 102. As discussed above, the cloud server 102 may transmit a service request received from the vehicle 108 to the edge server 104. In addition, the cloud server may separate a computing task into a plurality of sub-tasks and transmit information about the sub-tasks to the edge server 104. This information may be received by the service request reception module 512. In some examples, the service request reception module 512 may receive a service request directly from the vehicle 108 in addition to or instead of from the cloud server 102.

The estimation module 514 may estimate the amount of computing resources needed to perform a computing task specified in a service request received by the service request reception module 512. Such a computing task may comprise a complete computing task specified in a service request or a sub-task as specified by the cloud server 102.

The negotiation module 516 may negotiate with the vehicle 108 and/or the cloud server 102 to determine which entity or entities should perform the computing task, as disclosed herein. In particular, the negotiation module 516 may generate a proposal indicating parameters or other details about how the edge server 104 may perform the requested computing task. The details of the proposal may be determined based on determinations made by the estimation module 514 with respect to the computing resources needed to perform the requested computing task. In embodiments, negotiation module 516 may generate a proposal indicating a latency and a cost associated with the performance of the computing task. In other examples, the proposal may indicate other information about the performance of the computing task, such as a computing module to be used, an allocated bandwidth, and the like. After the negotiation module 516 generates a proposal, the proposal may be transmitted to the vehicle 108 and/or the cloud server 102. In some examples, the negotiation module 516 may generate multiple proposals for performing the computing task or sub-tasks thereof.

As discussed above, in some examples, the task separation module 416 of the cloud server 102 may divide the computing task into a plurality of sub-tasks. In these examples, the negotiation module 516 may generate one proposal for the edge server 104 to perform the entire computing task, as well as additional proposals for the edge server 104 to propose one or more sub-tasks specified by the cloud server 102. For proposals for performing sub-tasks, the negotiation module 516 may transmit such proposals to the cloud server 102 such that the cloud server 102 may generate one or more aggregate proposals for the performance of each specified sub-task, as described above. For proposals for performing the entire specified computing task, the negotiation module 516 may transmit such a proposal to the cloud server 102, which may relay the proposal to the vehicle 108, or the negotiation module 516 may transmit such a proposal directly to the vehicle 108.

The negotiation module 516 may receive an acceptance of a proposal to perform a computing task or a sub-task from either the cloud server 102 or the vehicle 108. After the negotiation module 516 receives an acceptance of a proposal, the computing task execution module 518 may execute the computing task in accordance with the proposal. In particular, the computing task execution module 518 may receive any data from the vehicle 108 needed to perform the computing task, and may execute the computing task or sub-tasks, as specified by the proposal, using the computing model specified by the proposal. After the computing task execution module 518 completes the performance of the computing task, the data transmission module 520 may transmit any data generated to the vehicle 108.

Figure 6:
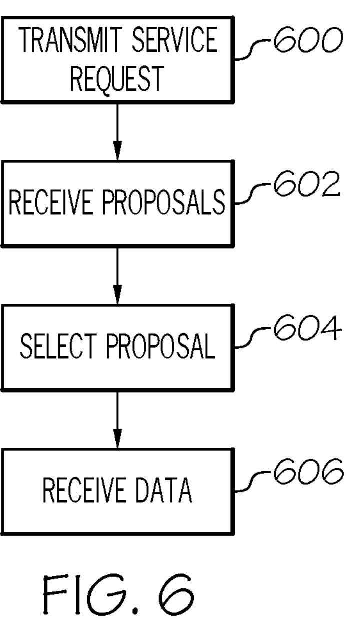
FIG. 6 depicts a flowchart for an example method that may be performed by the vehicle system of FIG. 2, according to one or more embodiments shown and described herein.

FIG. 6 depicts a flowchart of an example method that may be implemented by the vehicle system 200 of the vehicle 108 for determining hardware and software configurations for executing vehicle applications. At step 500, the service request transmission module 300 transmits a service request to the cloud server 102. As discussed above, the service request may specify information about a computing task to be performed that may assist with operation of the vehicle 108. As discussed above, the service request may specify certain requirements (e.g., latency, cost) associated with the computing task to be performed.

At step 602, the proposal reception module 302 receive one or more proposals for performing the specified computing task. In some examples, the proposal reception module 302 may receive one or more proposals from the cloud server 102. In other examples, the proposal reception module 302 may also receive one or more proposals from the edge servers 104, 106. As discussed above, a proposal received by the proposal reception module 302 may specify parameters about how the specified computing task will be executed (e.g., latency, cost, what computing model will be used, and which entity or entities will execute the computing task and/or sub-tasks thereof).

At step 604, the negotiation module 304 selects a proposal from among the proposals received by the proposal reception module 302. As discussed above, the negotiation module 304 may select a proposal based on latency, cost, a combination thereof, or other factors specified in the proposals received by the proposal reception module 302. The negotiation module 304 may transmit an acceptance of the selected proposal to the cloud server 102, the edge server 104, and/or the edge server 106.

At step 606, the data reception module 306 receives data associated with the computing task after the computing task has been executed by one or more entities. The data received by the data reception module 306 may be an output of a computing model used to perform the specified computing task. For example, if the computing task is related to object detection, the data received by the data reception module 306 may indicate data about a detected object. If the computing task is related object motion prediction, the data received by the data reception module 306 may be a predicted trajectory of an object. After the data reception module 306 receives the data, the vehicle 108 may autonomously perform one or more driving operations based on the received data.

Figure 7:
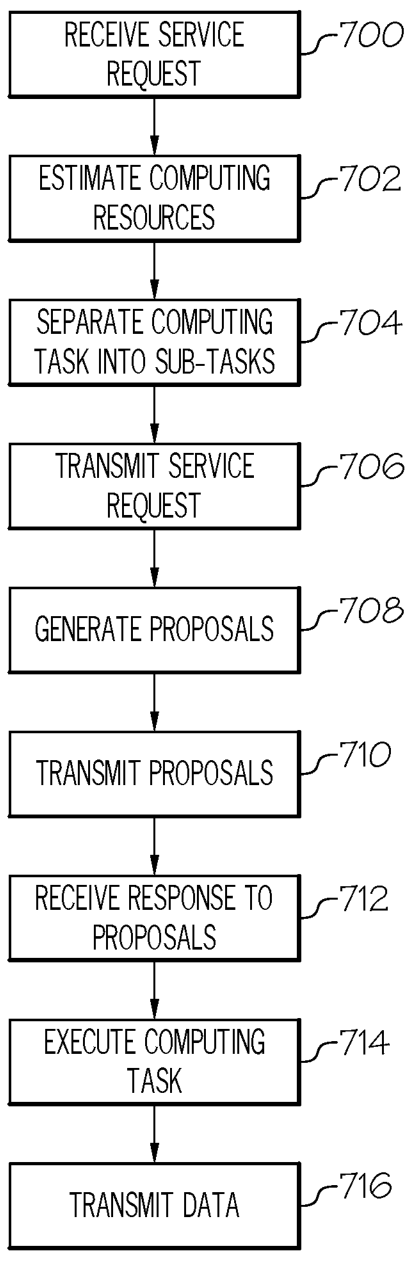
FIG. 7 depicts a flowchart for an example method that may be performed by the cloud server of FIG. 4, according to one or more embodiments shown and described herein.

FIG. 7 depicts a flowchart of an example method that may be implemented by the cloud server 102 for determining hardware and software configurations for executing vehicle applications. At step 700, the service request reception module 412 receives a service request from the vehicle 108. As discussed above, the service request may specify a variety of information about a computing task to be performed, including the operations to be performed, and one or more requirements for the performance of the computing task (e.g., latency, cost, computing model to be used).

At step 702, the estimation module 414 estimates the computing resources that the cloud server 102 needs to use to perform the specified computing task. The estimation module 414 may determine this estimate based on the details of the computing task specified in the service request, and the hardware and software available on the cloud server 102.

At step 704, the task separation module 416 separate the computing task into a plurality sub-tasks that may be performed separately by different entities with the results combined to complete the computing task. In some examples, the task separation module 416 may determine that the computing task cannot be separated into a plurality of sub-tasks.

At step 706, the service request transmission module 418 transmits a service request to one or more edge servers (e.g., the edge servers 104, 106 of FIG. 1). In some examples, the service request transmission module 418 relays the service request received from the vehicle 108 to the edge servers 104, 106. In other examples, the service request transmission module 418 transmits information about the sub-tasks specified by the task separation module 416 to the edge servers 104, 106.

At step 708, the negotiation module 420 generates one or more proposals based on the service request received by the service request reception module 412 and the estimation of needed computing resources determined by the estimation module 414. As discussed above, a proposal may specify parameters about the execution of a computing task including which entity or entities will perform the computing task, what computing model will be used, latency, and cost. In some examples, the negotiation module 420 may generate multiple proposals for the performance of a computing task. For example, different proposals may have different costs, different latencies, or may have different sub-tasks performed by a different combination of entities.

At step 710, the negotiation module 420 transmits the generated one or more proposals to the vehicle 108. At step 712, the negotiation module 420 receives a response to the transmitted proposals from the vehicle 108. The response may specify which, if any, of the transmitted proposals have been accepted by the vehicle 108.

At step 714, the computing task execution module 422 executes the specified computing task in a manner specified by the proposal accepted by the vehicle 108. A step 716, the data transmission module 424 transmits the data generated by the execution of the computing task to the vehicle 108. The data transmitted to the vehicle 108 may cause the vehicle 108 to autonomously perform one or more driving operations.

Figure 8:
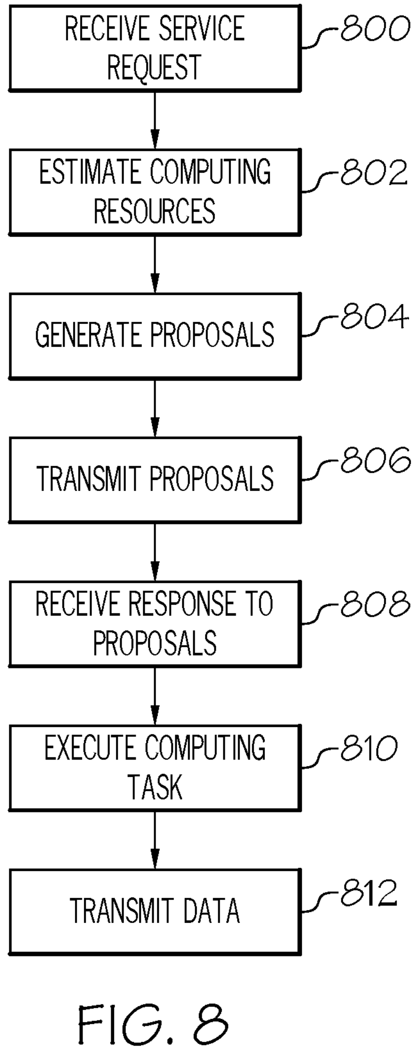
FIG. 8 depicts a flowchart for an example method that may be performed by the edge server of FIG. 5, according to one or more embodiments shown and described herein.

FIG. 8 depicts a flowchart of an example method that may be implemented by the edge server 104 or the edge server 106 for determining hardware and software configurations for executing vehicle applications. At step 800, the service request reception module 512 receives a service request from the cloud server 102. In some examples, the service request received by the service request reception module 512 contains information about the specified computing task to be performed. In some examples, the service request received by the service request reception module 512 contains information about one or more sub-tasks to be performed, as specified by the cloud server 102. In some examples, the service request reception module 512 may receive the service request from the vehicle 108 instead of or in addition to the cloud server 102.

At step 802, the estimation module 514 estimates the computing resources that the edge server 104 needs to use to perform the specified computing task. The estimation module 514 may determine this estimate based on the details of the computing task specified in the service request, and the hardware and software available on the edge server 104.

At step 804, the negotiation module 516 generates one or more proposals based on the service request received by the service request reception module 512 and the estimation of needed computing resources determined by the estimation module 514. Proposals may relate to the performance of the specified computing task, and/or one or more sub-tasks thereof.

At step 806, the negotiation module 516 transmits the generated one or more proposals to the cloud server 102 and/or the vehicle 108. At step 808, the negotiation module 516 receives a response to the transmitted proposals from the vehicle 108 or the cloud server 102. The response may specify which, if any, of the transmitted proposals have been accepted by the vehicle 108.

At step 810, the computing task execution module 518 executes the specified computing task or specified sub-tasks thereof in a manner specified by the proposal accepted by the vehicle 108. A step 812, the data transmission module 520 transmits the data generated by the execution of the computing task to the cloud server 102 and/or the vehicle 108. The transmitted data may cause the vehicle 108 to autonomously perform one or more driving operations.

It should now be understood that, embodiments disclosed herein include a system framework for software and hardware configuration determination for vehicle applications with cloud and edge computing. By optimally selecting which of a vehicle system, a cloud server, and one or more edge servers are to perform a computing task, and selecting optimal hardware and software configurations for each, efficiency of vehicle system operations may be improved.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computing device comprising a processor configured to:

separate a computing task into a plurality of sub-tasks;

determine an estimated amount of computing resources needed for the computing device to perform each of the plurality of sub-tasks;

transmit information about the plurality of sub-tasks to one or more second computing devices;

obtain, from one or more second computing devices, one or more first proposals for one or more of the second computing devices to perform one or more of the plurality of sub-tasks;

generate one or more second proposals for the computing device and the one or more second computing devices to perform the plurality of sub-tasks based on the one or more first proposals and the estimated amount of computing resources needed for the computing device to perform each of the plurality of sub-tasks, each of the one or more second proposals indicating which of the computing device and the one or more second computing devices are to perform each of the plurality of sub-tasks and parameters associated with performance of each of the plurality of sub-tasks;

transmit the one or more second proposals to a vehicle;

receive, from the vehicle, an acceptance of one of the second proposals;

transmit the acceptance of the accepted second proposal to the one or more second computing devices;

perform the plurality of sub-tasks to be performed by the computing device according to the accepted second proposal to generate first sub-task data;

receive second sub-task data associated with the performance of the plurality of sub-tasks to be performed by the one or more second computing devices according to the accepted second proposal; and transmit the first sub-task data and the second sub-task data to the vehicle.

2. The computing device of claim 1, wherein the computing device is configured to cause the vehicle to perform one or more driving operations based on the data transmitted to the vehicle.

3. The computing device of claim 1, wherein at least one of the parameters comprises a cost associated with the performance of one or more of the plurality of sub-tasks.

4. The computing device of claim 1, wherein at least one of the parameters comprises a latency associated with the performance of one or more of the plurality of sub-tasks.

5. The computing device of claim 1, wherein at least one of the parameters comprises a computing model to be used by the computing device or the one or more second computing device to perform one or more of the plurality of sub-tasks.

6. A method comprising:

separating a computing task into a plurality of sub-tasks;

determining an estimated amount of computing resources needed for a computing device to perform each of the plurality of sub-tasks;

transmitting information about the plurality of sub-tasks to one or more second computing devices;

obtaining, from one or more second computing devices, one or more first proposals for one or more of the second computing devices to perform one or more of the plurality of sub-tasks;

generating one or more second proposals for the computing device and the one or more second computing devices to perform the plurality of sub-tasks based on the one or more first proposals and the estimated amount of computing resources needed for the computing device to perform each of the plurality of sub-tasks, each of the one or more second proposals indicating which of the computing device and the one or more second computing devices are to perform each of the plurality of sub-tasks and parameters associated with performance of each of the plurality of sub-tasks;

transmitting the one or more second proposals to a vehicle;

receiving, from the vehicle, an acceptance of one of the second proposals;

transmitting the acceptance of the accepted second proposal to the one or more second computing device;

performing the plurality of sub-tasks to be performed by the computing device according to the accepted second proposal to generate first sub-task data;

receiving second sub-task data associated with the performance of the plurality of sub-tasks to be performed by the one or more second computing devices according to the accepted second proposal; and transmitting the first sub-task data and the second sub-task data to the vehicle.

7. The method of claim 6, further comprising causing the vehicle to perform one or more driving operations based on the data transmitted to the vehicle.

8. The method of claim 6, wherein at least one of the parameters comprises a cost associated with the performance of one or more of the plurality of sub-tasks.

9. The method of claim 6, wherein at least one of the parameters comprises a latency associated with the performance of one or more of the plurality of sub-tasks.

10. The method of claim 6, wherein at least one of the parameters comprises a computing model to be used by the computing device or the one or more second computing device to perform one or more of the plurality of sub-tasks.

11. A system comprising:

a cloud server; and one or more edge servers, wherein the cloud server is configured to:

separate a computing task into a plurality of sub-tasks;

determine an estimated amount of computing resources needed for the cloud server to perform each of the plurality of sub-tasks;

transmit information about the plurality of sub-tasks to the one or more edge servers;

receive, from one or more of the edge servers, one or more first proposals for one or more of the edge servers to perform one or more of the plurality of sub-tasks;

generate one or more second proposals for the cloud server and the one or more edge servers to perform the plurality of sub-tasks based on the one or more first proposals and the estimated amount of computing resources needed for the cloud server to perform each of the plurality of sub-tasks, each of the one or more second proposals indicating which of the cloud server and the one or more edge servers are to perform each of the plurality of sub-tasks and parameters associated with performance of each of the plurality of sub-tasks;

transmit the one or more second proposals to a vehicle;

receive, from the vehicle, an acceptance of one of the second proposals;

transmit the acceptance of the accepted second proposal to the one or more edge servers;

perform the plurality of sub-tasks to be performed by the cloud server according to the accepted second proposal to generate first sub-task data;

receive second sub-task data associated with the performance of the plurality of sub-tasks to be performed by the one or more edge servers according to the second proposal; and transmit the first sub-task data and the second sub-task data to the vehicle, wherein the one or more edge servers are configured to:

receive the information about the plurality of sub-tasks from the cloud server;

determine the one or more first proposals for one or more of the edge servers to perform one or more of the plurality of sub-tasks;

transmit the one or more first proposals to the cloud server;

receive the acceptance of the accepted second proposal from the cloud server;

perform the plurality of sub-tasks to be performed by the one or more edge servers according to the accepted second proposal to generate the second sub-task data; and transmit the second sub-task data to the cloud server.

12. The system of claim 11, wherein the cloud server is configured to cause the vehicle to perform one or more driving operations based on the data transmitted to the vehicle.

13. The system of claim 11, wherein at least one of the parameters comprises a cost associated with the performance of one or more of the plurality of sub-tasks.

14. The system of claim 11, wherein at least one of the parameters comprises a latency associated with the performance of one or more of the plurality of sub-tasks.

15. The system of claim 11, wherein at least one of the parameters comprises a computing model to be used by the cloud server or the one or more edge servers to perform one or more of the plurality of sub-tasks.

* * * * *